United States Patent [19]
Yrjönen et al.

[11] Patent Number: 5,173,607
[45] Date of Patent: Dec. 22, 1992

[54] METHOD FOR THE CORRECTION OF A COUNTING ERROR IN LIQUID SCINTILLATION COUNTING

[75] Inventors: Tapio Yrjönen, Turku; Jan Østrup, Kaarina, both of Finland

[73] Assignee: Wallac Oy, Turku, Finland

[21] Appl. No.: 689,917

[22] PCT Filed: Dec. 1, 1989

[86] PCT No.: PCT/FI89/00221
§ 371 Date: May 31, 1991
§ 102(e) Date: May 31, 1991

[87] PCT Pub. No.: WO90/06527
PCT Pub. Date: Jun. 14, 1990

[30] Foreign Application Priority Data
Dec. 2, 1988 [FI] Finland ............... 885616

[51] Int. Cl.$^5$ .............................. G01T 1/204
[52] U.S. Cl. ..................... 250/362; 250/328; 250/364
[58] Field of Search ............ 250/364, 362, 328

[56] References Cited

U.S. PATENT DOCUMENTS

| | | | |
|---|---|---|---|
| 4,684,250 | 8/1987 | Kukka et al. | 356/246 |
| 4,694,176 | 9/1987 | Horrocks | 250/362 |
| 4,700,072 | 10/1987 | Oikari et al. | 250/328 |
| 4,987,306 | 1/1991 | Dodson | 250/362 |

Primary Examiner—Constantine Hannaher
Attorney, Agent, or Firm—Armstrong & Kubovcik

[57] ABSTRACT

A method for correction of the counting error in liquid scintillation counting in the attenuation of light passing through a sample solution is measured before or after the actual liquid scintillation counting takes place. By means of the attenuation measurement the error in the liquid scintillation counting result, caused by the colorness of the sample solution, and/or by the counting apparatus, is corrected. The apparatus has a liquid scintillation counter provided with cylinder shaped optics. A photometer is incorporated in the liquid scintillation counter. By means of the photometer, the attenuation of light passing through the sample solution is measured before or after the actual liquid scintillation counting measurement, where said attenuation is caused by the colorness of the sample solution and/or due to features of the apparatus.

13 Claims, 2 Drawing Sheets

METHOD FOR THE CORRECTION OF A COUNTING ERROR IN LIQUID SCINTILLATION COUNTING

BACKGROUND OF THE INVENTION

The object of the present invention is a method for correcting a counting error in liquid scintillation counting. Liquid scintillation counters are commonly used for counting samples which contain low energy beta or corresponding particles emitting radioactive isotopes such as tritium and carbon-14. The range of the low energy beta particles in the sample is generally at the most a few tens of micrometers. As a consequence, the specimen to be analyzed has to be dissolved into a scintillation liquid, in which the molecules of the isotope to be counted are close enough to the molecules of the scintillation substance so that the beta particles emitted by the isotope to be counted can interact with the molecules of the scintillation substance. In this interaction process a part of the energy of the beta particle is transformed into light, which is converted to an electric pulse generally by means of two photomultiplier tubes which operate in coincidence. The purpose of the coincidence operation is the elimination of the thermal noise of the photomultiplier tubes. The amplitude of said electric pulse is proportional to the energy of the beta particle interacting with the scintillation substance.

Besides said thermal noise there are also other possible errors. The counting error can be caused by both the properties of the apparatus and the quality of the sample. One basic problem which causes counting error is the quenching of the sample, which can be classified into two main categories: i.e. chemical quench and color quench. The chemical quench is a phenomenon, where the solution formed by the specimen and the scintillation substance contains some impurities which reduce the efficiency of the counting system to detect the emitted beta particles by absorbing them. The color quench is a phenomenon, where the solution formed by the specimen and the scintillation substance contains some impurities, which absorb produced scintillation photons. This also leads to the reduction of the counting efficiency.

It is a well-known fact in the field of liquid scintillation counting that the reduction of the counting efficiency due to the chemical and color quenching can be corrected separately by means of quench curves, which describe the relationship between the counting efficiency and the amount of chemical or color quench. The problem arises when samples to be analyzed contain impurities which simultaneously cause chemical and color quench. In the U.S. Pat. No. 4,700,072 is described a method, by means of which the difference of the counting efficiency of the sample to be analyzed compared to the counting efficiency of the sample which contains only chemical quench can be corrected, based on that the colorness of the sample produces a change to the proportion of the pulse amplitudes observed by the photomultiplier tubes. This is a consequence of that the scintillation photons arriving to either photomultiplier tube have to pass a longer path in the coloured solution formed by the specimen and the scintillation substance, whereas photomultiplier tube observes less photons because some of them have been absorbed during the passage.

SUMMARY OF THE INVENTION

The object of this invention is to produce a novel method which differs from the known level of technique, for the correction of the counting error. By means of the invention it is possible to correct the counting error caused by the colorness of the sample solution on one hand and the counting apparatus on the other. The invention is characterized in that the attenuation of the light passing through the sample is measured before or after the actual liquid scintillation counting of the sample takes place. The error in the liquid scintillation counting result caused by the colorness of the sample solution is corrected by means of said attenuation measurement.

By means of the invention the difference in the counting efficiency of the sample to the counting efficiency of a purely chemically quenched sample can be corrected by measuring the absorption of the light passing through the sample, the sample container and the whole counting chamber. The obtained absorption coefficient is used as an entity, by means of which the observed count rate of the sample is corrected to correspond to the count rate of a purely chemically quenched sample.

Another object of the invention is an apparatus to carry out the described method, characterized in that a photometer is comprised to a liquid scintillation counter provided with a cylindrical optics. The attenuation of the light passed through the sample solution and caused by the colorness of said solution is measured by means of said photometer before or after the actual liquid scintillation counting of the sample.

The other characteristic features of the present invention will become apparent later in the patent claims.

BRIEF DESCRIPTION OF THE DRAWINGS

The present invention will be described in more detail below with reference to the attached drawings, wherein.

DESCRIPTION OF THE PREFERRED EMBODIMENTS

Figure 1:
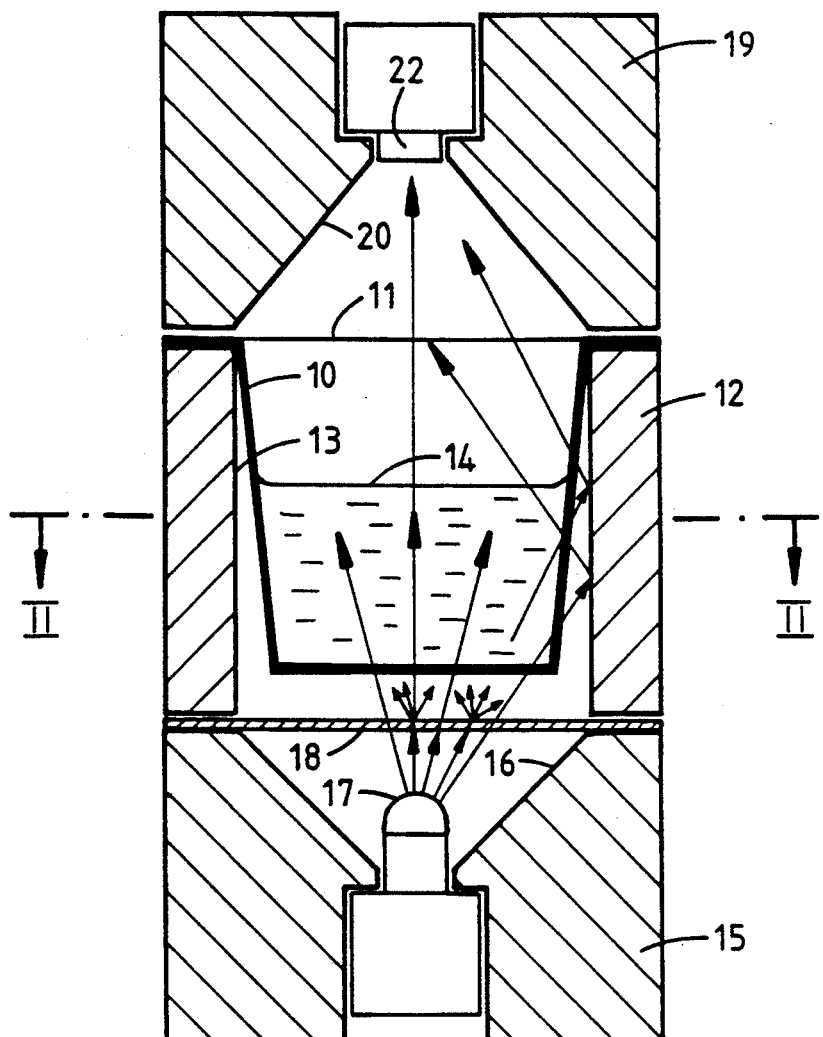
FIG. 1 is a vertical sectional view of a measuring chamber in a liquid scintillation counter provided with a photometer.

According to the present invention, a photometer shown in FIG. 1 is comprised of a liquid scintillation counter provided with a cylindrical measuring chamber 12. The counter is called a liquid scintillation counter with cylinder shaped optics. A cylindrical or slightly conical sample container 10 closed by a lid 11 is inserted into the measuring chamber 12. The container can be sealed by adhesive tape. The sample container 10 contains the sample solution 14 formed of the specimen and the scintillation substance. The inner surface 13 of the measuring chamber 12 reflects or scatters light. The purpose of this reflecting is to guide the scintillation photons produced by the sample solution 14 to photomultiplier tubes (23, 24) shown in FIG. 3.

The example of FIG. 1 in accordance with the present invention illustrates a photometer connected to a liquid scintillation counter provided with cylinder shaped optics. The photometer is used to define the absorption of the measuring system comprising a sample container 10 including sample solution 14, lid 11 of the sample container 10 and the inner surface 13 of the measuring chamber 12. The absorption of the light from a constant light source 17 in the system is detected by a photodetector 22. The light source 17 is fixed to a lower support piece provided with a reflector cone which is a coated surface 16 and which scatters the light emitted by the light source 17. Between the measuring chamber 12 and the light source 17 is disposed an translucent plate 18 which unifies the scattering of the light to the measuring chamber 12. The greater the colorness of the sample solution 14, the greater the amount of light emitted by the light source 17 is absorbed by the sample solution 14 and the lesser the amount of light is detected by the photodetector 22. The voltage or other response of the photodetector 22 is used as a measure of the colorness of the sample solution 14. The measuring system also takes into account that the poorer the quality of the sample container 10, the lesser light is detected. For example, the sample container can be dirty or the light penetrates it poorly.

Because the light emitted by the light source 17 is distributed uniformly to the whole area of the measuring chamber, the photometer also detects the absorption effect of the sample container 10, the lid 11 of the sample container 10 and the measuring chamber 12. As such, the method can be used to correct the reduced counting efficiency caused by the unclean inner surface 13 of the measuring chamber 12 and the variation in the counting efficiency caused by the different sample containers 10 and lids 11. The photodetector 22 is fixed to an upper support piece 19 provided with a cone 20 coated with a light reflecting layer. The light impinging on the photodetector 22 is collected as well as possible from the area of the whole measuring chamber 12 by means of the cone 20.

The observed count rate of the sample can be corrected by means of the absorption coefficient A measured by the photodetector 22 by using the following formula:

> The corrected count rate of the sample = the observed count rate of the sample * $f(A)$    Formula 1

Function f(A) is a theoretically or experimentally derived function.

The operation principle of the correction method is as follows:

The function f(A) is stored in the computer memory of the apparatus. It is defined theoretically or by measuring the standard samples with different absorption coefficients. One of the standard samples does not contain any impurities which would cause color quench. The absorption coefficient of this standard sample is denoted as zero and the absorption coefficients of the other standards are defined in proportion to this zero standard.

For samples to be analyzed in addition to the actual liquid scintillation measurement the absorption coefficient is measured and the corrected count rate of the sample is calculated from formula 1.

Figure 2:
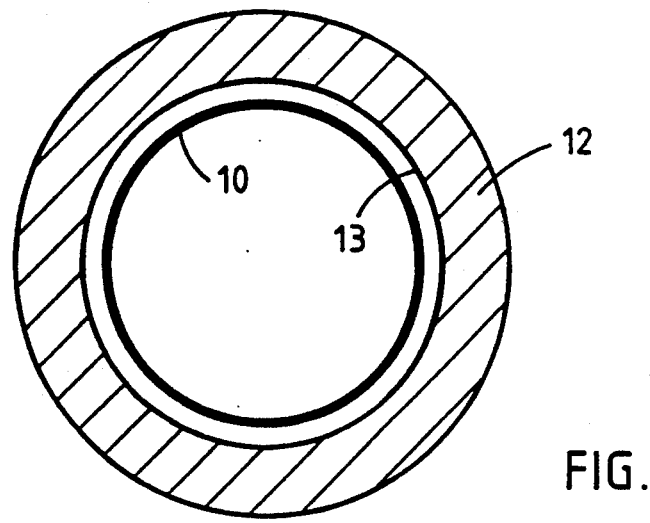
FIG. 2 is a cross sectional view taken along the line II—II in FIG. 1.

FIG. 2 depicts a horizontal cross sectional view of FIG. 1. It shows the circular cross sections of the cylinder shaped or conical sample container 10 and the measuring chamber 12. The inner surface 13 of the measuring chamber 12 is produced of material which reflects or scatters the scintillation light produced by the sample. In the light measurement shown in FIG. 1 this surface 13 also reflects the light emitted by the light source 17 to the photodetector 22.

Figure 3:
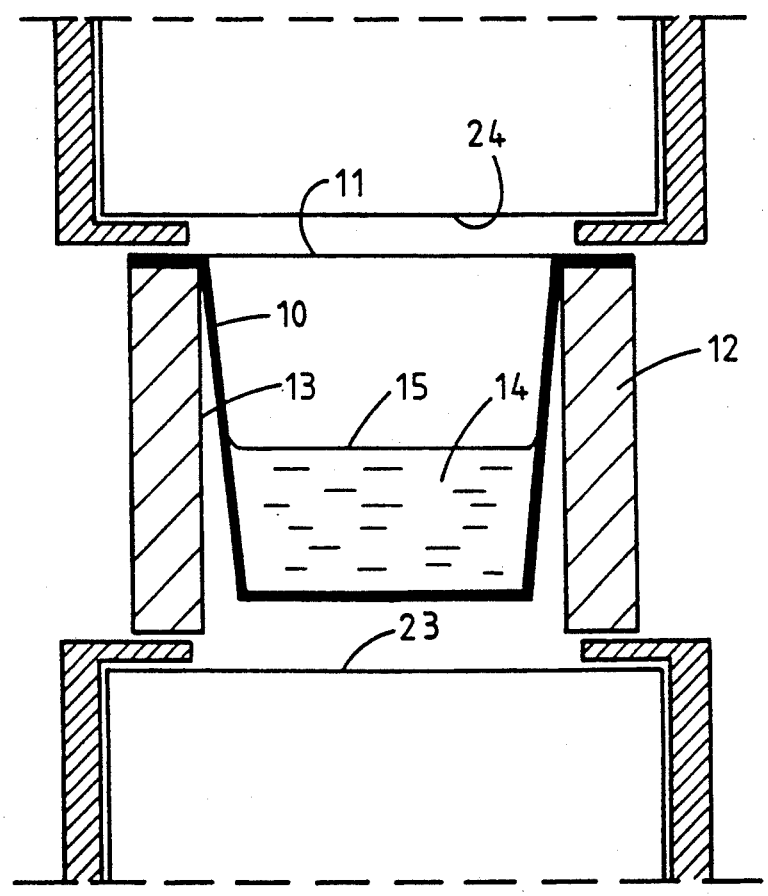
FIG. 3 corresponds to FIG. 1 and shows a measuring chamber provided-instead of a photometer-with photomultiplier tubes for liquid scintillation counting.

In FIG. 3, there is shown a liquid scintillation counting arrangement, where the photometer shown in FIG. 1 is replaced by photomultiplier tubes 23, 24 of the liquid scintillation counter. The operation of the apparatus is designed so that the sample container 10 with the measuring chamber 12 moves first in horizontal direction to the photometer shown in FIG. 1, where the quench level of the sample and of the whole system is defined. After this the measuring chamber 12 with the sample container moves to the station of the photomultiplier tubes 23, 24, where the actual liquid scintillation counting is carried out. The measuring result obtained by the photometer is used for correcting the possible error in the counting efficiency of the liquid scintillation counting. Naturally, the measurements can also be done in opposite order if this is preferable due to the construction of the apparatus or for other reasons.

The method according to the present invention is not confined to the above illustrated example, but contains all the correction methods within the scope of the patent claims for correcting errors in liquid scintillation counting caused by the colorness of the sample solution, the correction methods being based on the measurements of the absorbance or corresponding properties of the solution of the sample.

What is claimed is:

1. A method for correcting a measurement error in liquid scintillation counting, comprising:
   passing light through a sample solution;
   detecting said light after passing through said sample solution;
   measuring attenuation of said light due to said passing of said light through said sample solution to arrive at an attenuation measurement;
   the method further comprising counting scintillation photons of said sample solution to arrive at a scintillation count; and
   correcting said scintillation count based on said attenuation measurement.

2. The method of claim 1, wherein said correcting comprises:
   determining a theoretical or experimental function for the attenuation of light due to the sample solution;
   calculating a correction coefficient based on said function; and
   modifying said scintillation count using said correction coefficient.

3. The method of claim 2, wherein said function is an experimental function and is obtained by measuring standard samples with different attenuations.

4. The method of any of claims 1, 2, and 3, wherein said correcting comprises:
   obtaining a difference of the counting efficiency of the photon scintillation counting due to a colorness of said sample solution compared to a purely chemically quenched sample by measuring an absorbance of light which passes through and is absorbed at least in part by said sample solution, a container holding said sample solution, a lid of said container, and a measurement chamber surrounding said container;
   determining an absorption coefficient based on said obtained difference; and
   changing said measured scintillation count based on said determined absorption coefficient to correspond to a count rate of a purely chemically quenched sample.

5. The method of claim 1, wherein said passing light comprises:
   providing a constant light source;
   reflecting and scattering light from said constant light source with a reflector cone surrounding said constant light source; and
   passing the reflected and scattered light through a plate which unifies and further scatters the light.

6. The method of claim 5, wherein said detecting of said light after passing through said sample solution comprises:
   collecting said light after passing through said sample solution by means of a cone having a reflecting surface; and
   detecting said collected light with a photodetector.

7. The method of claim 1, wherein said counting scintillations comprises positioning said sample solution proximate to photomultiplier tubes and counting scintillation photons by means of said photomultiplier tubes.

8. An apparatus comprising:
   a container for holding a sample solution to be measured;
   a scintillation counter having cylinder shaped optics for counting scintillation of said sample solution; and
   a photometer for measuring the attenuation of light passing through said sample solution.

9. The apparatus of claim 8, wherein said photometer comprises:
   a light source; and
   a photodetector disposed above said light source and defining a space therebetween.

10. The apparatus of claim 9, wherein said scintillation counter comprises first and second photomultiplier tubes positioned so as to define a space therebetween.

11. The apparatus of claim 10, further comprising a measuring chamber for surrounding said container for holding said sample solution;
   wherein said measuring chamber is disposed in said space between said light source and said photodetector during the measuring of the attenuation of light passing through said sample solution; and
   wherein said measuring chamber is disposed in said space between said first and second photomultiplier tubes during the counting of the scintillation of said sample solution.

12. The apparatus of claim 9, wherein said photometer further comprises a first reflecting cone proximate to said light source for reflecting and scattering said light from said light source, and a second reflecting cone proximate to said photodetector for collecting and funneling said light to said photodetector after passing through said sample solution.

13. The apparatus of claim 12, wherein said photometer further comprises a light scattering plate disposed between said light source and said sample solution for unifying and scattering said light from said light source prior to passing through said sample solution.

* * * * *